United States Patent [19]

Coccagna

[11] 3,735,372

[45] May 22, 1973

[54] SEVEN OR NINE CHANNEL READOUT WITH ADJUSTABLE THRESHOLD

[75] Inventor: Edmund G. Coccagna, Villanova, Pa.

[73] Assignee: Mohawk Data Sciences Corporation, Herkimer, N.Y.

[22] Filed: July 2, 1971

[21] Appl. No.: 159,313

[52] U.S. Cl. .......... 340/174.1 H

[51] Int. Cl. .......... G116 5/44

[58] Field of Search .......... 340/174.1 D, 174.1 H; 179/100.2 MD

[56] References Cited

UNITED STATES PATENTS

| | | | |
|---|---|---|---|
| 3,413,625 | 11/1968 | Mitterer et al. | 340/174.1 H |
| 3,152,322 | 10/1964 | Lawrence | 340/174.1 D |
| 3,377,584 | 4/1968 | Ault | 340/174.1 D |
| 3,164,815 | 1/1965 | Applequist | 340/174.1 H |
| 3,623,040 | 11/1971 | Erikson | 340/174.1 H |
| 3,597,751 | 8/1971 | Heidecker | 340/174.1 H |
| 3,593,334 | 7/1971 | Bickel | 340/174.1 H |
| 3,404,391 | 10/1968 | Chur | 340/174.1 H |
| 3,631,424 | 12/1971 | Regitz | 340/174.1 H |

*Primary Examiner*—Vincent P. Canney
*Attorney*—Francis J. Thomas, Richard H. Smith and Thomas C. Siekman et al.

[57] ABSTRACT

A circuit for reading digital information recorded on magnetic tape. Nine transducers are arranged to sense information recorded on nine-channel magnetic tape and seven other transducers are arranged to sense data recorded on seven-channel magnetic tape. The circuit includes means for selecting the outputs of either the first or the second group of transducers so that data from either seven or nine-channel magnetic tape may be read. The input signal obtained from each transducer in the appropriate selected group is fed to a pair of subcircuits, one of the pair providing a signal in response to each negative pulse in the input signal at that pulses's peak and the other subcircuit providing a signal in response to each positive pulse in the input signal at that pulses's peak. Each of these subcircuits contains a threshold circuit which indicates each pulse that is greater (higher or lower) than a predetermined threshold and the output of the threshold circuit is gated with the output of a peak-detecting circuit so subcircuit each subcircuit provides a signal at the peak of each pulse which is greater than a predetermined threshold. The outputs of both subcircuits are fed to an output circuit which provides a signal in response to receiving a pulse-indicating signal from either of the subcircuits. The circuit includes means for adjusting the threshold level of the threshold circuits so that the sensitivity of the circuit may be adjusted. Preferably, the threshold adjustment may be made to a 100 percent threshold level to aid in tuning the circuit.

8 Claims, 3 Drawing Figures

INVENTOR.
EDMUND G. COCCAGNA
BY Thomas C. Sullivan
ATTORNEY

SEVEN OR NINE CHANNEL READOUT WITH ADJUSTABLE THRESHOLD

BACKGROUND OF THE INVENTION

In recording digital information on magnetic tape, the data are commonly recorded in either seven or nine longitudinal channels arranged across the tape. To read this data, the tape is passed under a plurality of read-transducers positioned to accommodate either the nine or seven channels. In data processing facilities which utilize both nine and seven channel tape, it has previously been necessary to employ two different tape reading machines, one machine for reading seven channel and the other for reading nine channel tape.

The input signal obtained from each read-transducer as the tape is passed beneath it is made up of a train of analog pulses which are related to the particular technique used in recording the data. To obtain the data, the pulses are fed to a read circuit which provides a digital output signal corresponding to the analog pulses from the transducer.

SUMMARY OF THE INVENTION

It is an object of this invention to provide a readout circuit which is simple and inexpensive but which accurately provides a digital output signal corresponding to the analog information obtained from the magnetic tape.

It is another object of this invention to provide such a readout circuit whose accuracy may be selectively adjusted.

It is another object of this invention to provide a magnetic readout circuit which is adapted to read information recorded on either seven or nine-channel magnetic tape.

These objects and others are achieved according to the invention wherein a first transducer is arranged to convert information recorded on one type of magnetic medium (e.g., a seven-channel tape) and a second transducer is arranged for converting information recorded on another type of magnetic medium (e.g., a nine-channel tape) and gating means is located between the transducers and the rest of the readout circuit to selectively choose the output of the appropriate transducer.

The signal from the appropriate transducer is fed as an input signal to two subcircuits, one of which provides a signal indicating each positive pulse in the input signal and the other of which indicates each negative pulse. Each subcircuit contains an element which provides a signal when a pulse greater than a predetermined threshold is present in the input signal. The output of this threshold element is gated with the output of a peak-detecting circuit so that each subcircuit provides a signal at the peak of each pulse greater than a predetermined threshold. Preferably, each peak-detecting circuit comprises a differentiating circuit which differentiates the input signal and feeds its output to a circuit which provides a signal when the output of the differentiating circuit crosses zero. The signal from each subcircuit is fed to an output circuit which provides an output pulse in response to a pulse-indicating signal from either subcircuit.

The levels of the threshold elements are adjustable to provide the read circuit with various degrees of accuracy. Also, the threshold elements may be set at 100 percent threshold level to precisely set the circuit for tuning.

DESCRIPTION OF THE PREFERRED EMBODIMENT

Figure 1:
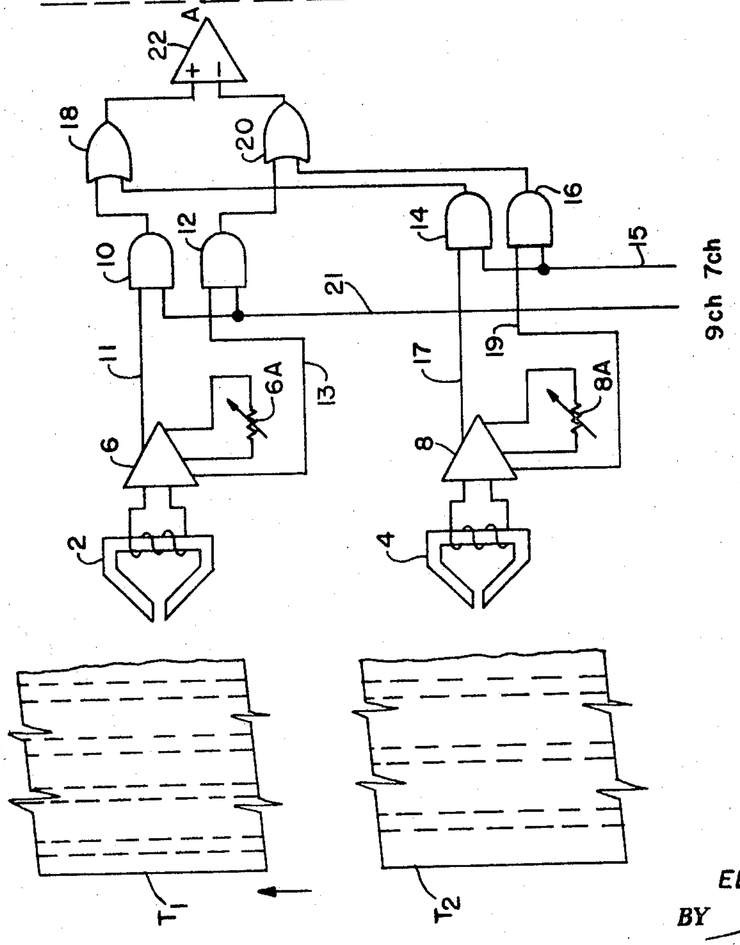

FIG. 1 illustrates a pair of transducers 2 and 4, each of which is associated with and feeds its output to an amplifier 6 or 8 whose gain is manually adjustable as indicated at 6*a* and 8*a*. The transducer 2 is arranged to sense the data recorded in a channel on a nine-channel magnetic tape and converts this data to a corresponding analog signal. Transducer 4 is arranged to sense the data recorded in a channel on a seven-channel magnetic tape and converts this data to a similar signal. The invention can be utilized to read data from either a seven or a nine channel magnetic tape and so contains seven transducers 4 (only one being shown) spaced for reading the data on a seven-channel magnetic tape and additionally includes nine transducers 2 (only one being shown) spaced for reading the data on a nine-channel tape. A nine-channel tape and a seven-channel tape are schematically partly shown as T1 and T2 respectively.

In order to read a channel of the nine-channel tape T1, the tape is passed under transducer 2 which, in response, provides an analog signal containing positive or negative pulses or both depending on the recording technique utilized. Similarly, a channel in the seven-channel magnetic tape to be read is passed under transducer 4 which provides an analog input signal in response. The other transducers which are not illustrated read the remaining channels of the seven or nine channel tape.

In order to select the appropriate transducers when a nine or seven channel tape is to be read, four two-input AND gates 10, 12, 14 and 16 are provided. These gates receive the analog signals from amplifiers 6, 8 and pass these signals when enabled. Gates 10 and 12 are arranged to receive the output on leads 11, 13 from amplifier 6 which amplifies the output of transducer 2. Similarly, gates 14 and 16 are arranged to receive the output on leads 17, 19 from amplifier 8 which amplifies the signal from transducer 4. In order to select the transducer which is to be utilized, leads 21 and 15 are provided. Lead 21 is connected to an input of each gate 10 and 12. Lead 15 is connected to an input of each gate 14 and 16. When nine-channel magnetic tape is to be read, a high signal designated 9*ch* in FIG. 1 is applied to lead 21 to enable AND gates 10 and 12 so that the output of transducer 2 may be utilized. Similarly, a signal designated 7*ch* in FIG. 1 is applied to lead 15 when a seven-channel magnetic tape is to be read and this signal enables AND gates 14 and 16. Obviously, the signals 9*ch* and 7*ch* are applied to their respective leads in a mutually exclusive fashion with the signal 9*ch* only appearing when nine-channel magnetic tape is to be read and the signal 7*ch* being utilized only when a seven-channel magnetic tape is to be read.

The output of gate 10 or 14, whichever is enabled, is fed via an OR gate 18 to the non-inverting input of a differential amplifier 22. Similarly, the output of gate 12 or 16, whichever is enabled, is fed via OR gate 20 to the inverting input of the differential amplifier 22. Each OR gate 18 or 20 passes the analog signal applied to it from the appropriate gate at one of its inputs. The differential amplifier 22 amplifies the analog outputs of ORS 18 and 20 and feeds the amplified signal to the main portion of the readout circuit shown in FIG. 2. There are nine circuits identical to the circuit of FIG. 2. Seven are shared between a seven-track transducer and a nine-track transducer through a connection similar to that shown between amplifier 22 of FIG. 1 and circuit 23 of FIG. 2. The other two circuits receive nine-track transducer inputs only.

Figure 2:
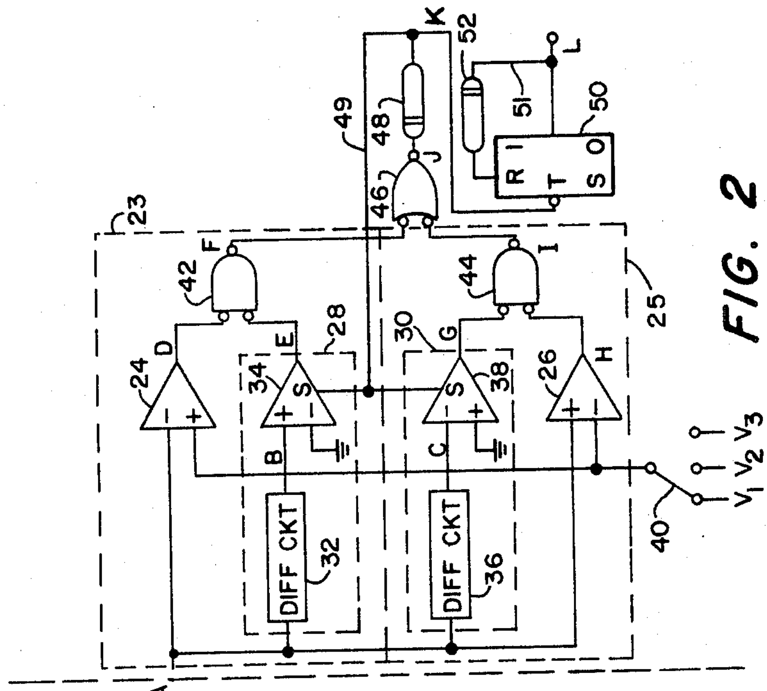
FIGS. 1 and 2, taken together, are a schematic diagram of a preferred embodiment of the readout circuit of the invention.

Referring to FIG. 2 the analog signal A from differential amplifier 22 is received by a pair of sub-circuits, 23 and 25. The first subcircuit comprises analog comparator 24, peak-detector 28 and gate 42. The other subcircuit contains comparable elements and comprises analog comparator 26, peak-detector 30 and gate 44. Gates 42 and 44 each perform a "negative" AND function (as indicated by the small circles at their inputs and outputs) in that each provides a low signal only in response to simultaneously occurring low signals at both inputs. At all other times the output is high (inactive). The output of AND 42 provides the output F of the first subcircuit 23 and indicates each positive pulse from the differential amplifier 22. Similarly, the output of gate 44 provides the output I of the second subcircuit and indicates each negative pulse in the signal from amplifier 22.

The comparators 24, 26 compare the voltage level of the input signal A with a reference voltage. Comparator 24 receives the input signal A at its inverting input and the reference voltage is applied to its non-inverting input. Comparator 26 receives the input signal A at its non-inverting input and has the reference voltage applied to its inverting input. Comparator 24 responds to each positive pulse in the input signal A above the reference voltage by providing an output pulse corresponding to that portion of the input pulse above the reference voltage. Similarly, comparator 26 provides an output pulse in response to receiving a negative pulse below the reference voltage and provides an output pulse corresponding to that portion of the input pulse below this reference potential. In this manner, comparators 24 and 26 are threshold detectors and provide output pulses whenever their input signals are respectively above or below a predetermined threshold.

As also indicated in FIG. 2, a three-way switch 40 is provided to selectively apply one of three different reference potentials V1, V2 or V3, to those inputs of the comparators which receive the reference potential. Thus, the threshold levels of comparators 24 and 26 may be selectively changed. By manually operating the threeway switch 40, the accuracy of the circuit may be adjusted since an increased reference potential sets the threshold levels of the comparators at higher (lower for comparator 26) values so that they respond to only the higher (or lower) pulses in the input signal. Further, one of the reference potentials, for example V3, may be adapted to set the comparators at 100 percent threshold levels where they only provide a signal at the peak of each pulse in the input signal which is exactly of the proper magnitude. Such a 100 percent threshold level setting is useful when initially setting up and tuning the read system. For example the amplifiers 6 and 8 in FIG. 1 must have their gains properly adjusted. By setting switch 40 so that comparators 24 and 26 are set at their 100 percent threshold levels, the gain of amplifiers 6 and 8 may be suitably set by monitoring the D and H outputs of comparators 24, 26 while a tape having a 1 bits is read and adjusting the amplifiers until these outputs (as displayed, for example, by an oscilloscope) comprise only short momentary pulses corresponding to the peak of each pulse in the input signal A.

Referring again to FIG. 2, each of the subcircuits 23 and 25 contains a peak-detector 28 or 30. Peak-detector 28 provides a negative shift in output signal E in response to the peak of each positive pulse in input signal A. This negative-going output signal is gated through 42 with the output D of comparator 24 so that gate 42 and thus the negative shift in the F output of subcircuit 23 indicates the occurrence of each positive pulse at precisely the peak of that pulse. Similarly, the other subcircuit 25 has a peak-detector 30 which provides a negative shift in the output G at the peak of each negative pulse in input signal A. This signal is gated through 44 with the output H of comparator 26 so that a negative shift occurs at the output of 44 at precisely the peak of each negative pulse detected.

As also shown in FIG. 2, each peak-detector (28 or 30) in subcircuits 23 or 25 comprises a differentiating circuit and zero-cross detector. In the first subcircuit 23, differentiating circuit 32 receives the input signal A from amplifier 22 and feeds its output B to the non-inverting input of another analog comparator 34. The inverting input of comparator 34 is connected to ground so that the comparator provides negative-going a signal at the output E of peak-detector 28 whenever the signal B from the differentiating circuit 32 crosses zero when going from positive to negative.

Similarly, with respect to the subcircuit 25, the peak-detector 30 comprises a differentiating circuit 36 which receives the input signal A and feeds the differentiated input signal C to the inverting input of another analog comparator 38 which has its non-inverting input connected to ground. Thus, the output for comparator 38 shift negative when the differentiated signal C received from element 36 crosses zero going from negative to positive. Since, the output B of differentiating circuit 32 and the output C of differentiating circuit 36 cross zero at the peak of pulses in the input signal, comparators 34 and 38 provide the outputs E and G of subcircuits 28 and 30 respectively at the peak of positive and negative pulses respectively.

Comparators 24 and 34 in subcircuit 23 and comparators 26 and 38 in subcircuit 25 also serve to convert the analog signals applied to their inputs to digital signals which are fed to gates 42 and 44.

The outputs F and I of gates 42 and 44 are fed to an OR gate 46 which provides a low signal J in response to receiving a low signal at either of its inputs. Thus, when either gate 42 or 44 provides a negative-going signal in response to sensing a positive or negative pulse (at that pulse's peak), OR gate 46 is activated to provide a negative shift via delay element 48 to a flip-flop 50. Flip-flop 50 receives the signal at its trigger input T and in response to the leading edge of each low signal (as indicated by the circle at its T input) provides a high output L at its 1 output. Lead 51 and delay 52 are provided to connect the 1 output of the flip-flop to its reset input R so that the flip-flop is reset back to its original state a predetermined time after its 1 output is activated high. Thus, with delay 52 a high pulse of predetermined width is obtained at the flip-flop's 1 output.

In summary, comparator 24 provides a pulse corresponding to each positive pulse in the input signal A above a certain threshold. The output of comparator 24 is gated through gate 42 with the output of a peak detecting circuit so that gate 42 provides an output F indicating each positive pulse at precisely the peak of that positive pulse. Comparator 26 and peak detector 30 of the second subcircuit provide similar functions with respect to the negative pulses in the input signal A so that gate 44 provides a signal I in response to each negative pulse at precisely the peak of that negative pulse. The outputs of gates 42 and 44 are fed to OR gate 46 which is connected to the trigger input of flip-flop 50 so that an output is provided from the 1 output of flip-flop 50 each time a signal is obtained from the first or second subcircuit 23 or 25.

With further respect to FIG. 2, the output J from OR 46 goes low in response to a low pulse-indicating signal at either of its inputs. At the end of such an input signal, the J output goes high. Element 48 is a variety of delay that delays only each low to high transition in the J signal and does not delay a high to low transition which is immediately applied from OR 46 to flip-flop 50. A lead 49 is provided to connect the output of element 48 to the comparators 34, 38 in peak-detectors 28 and 30. The lead 49 is connected to strobe inputs S of these elements and a low signal on lead 49 serves to clamp either or both of the comparators 34, 38 in the state indicating the presence of a peak in input signal A if the comparator is in such a state when its strobe input is received. Thus, element 48 and lead 49 serve to maintain whichever comparator(34 or 38) is in its state indicating a peak for as long as J is low and for a predetermined time (determined by the delay interval of element 48) thereafter. This prohibits comparators 34 and 38 from prematurely switching back to their original states in response to interfering outside signals and insures that for each occurring pulse, a suitable signal is provided for triggering the flip-flop 50.

The read circuit as illustrated in FIGS. 1 and 2 contains few elements and those may be easily an inexpensively obtained. For example, two analog comparators (24 and 34 or 26 and 38) together with a gate (42 or 44) may be obtained as a single integrated circuit designated A 711-C from Fairchild Camera and Instrument Corp., Semiconductor Division, Mountain View, Calif.

Figure 3:
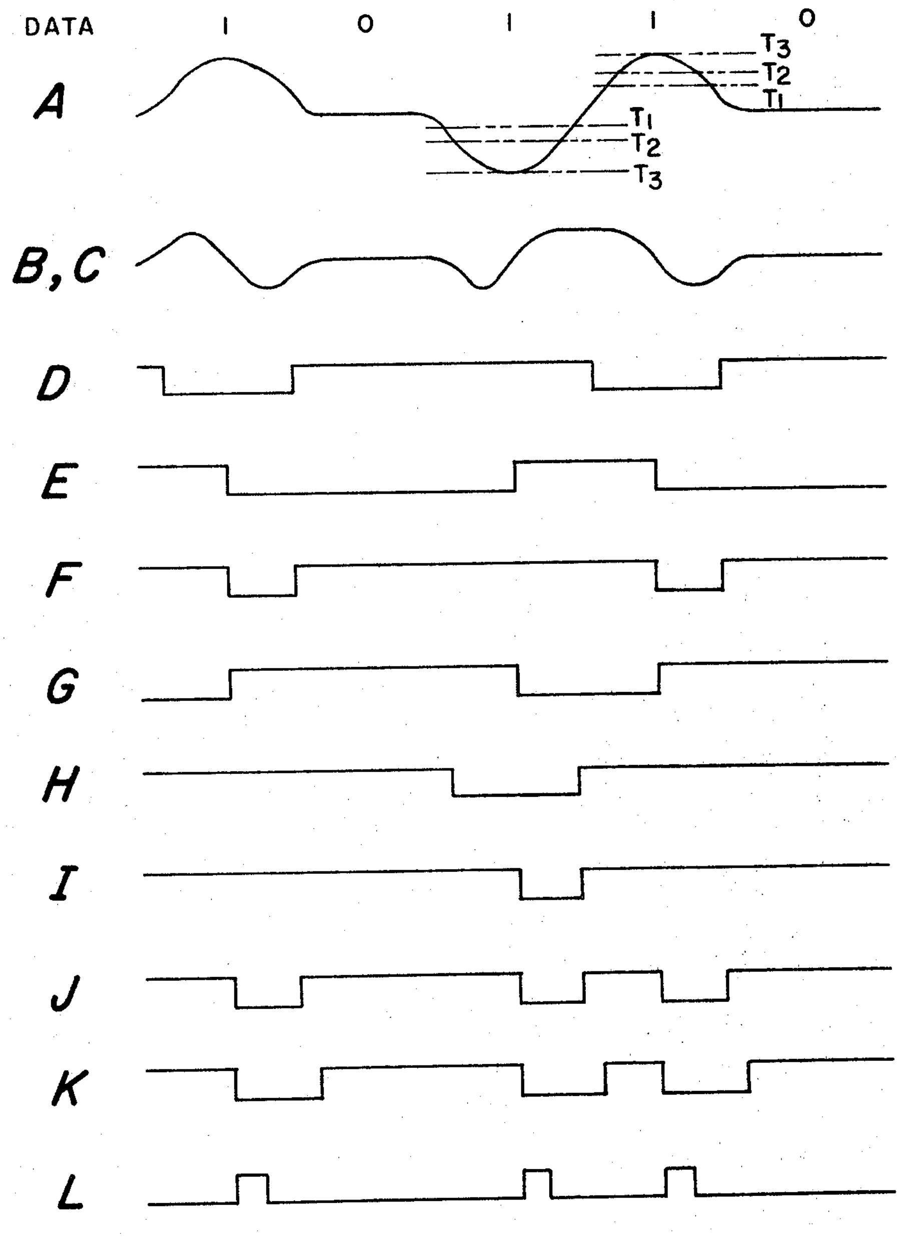
FIG. 3 is a waveform diagram illustrating the operation of the elements shown in FIG. 2 for an illustrative input signal.

FIG. 3 shows a typical sequence of digital binary data recorded in one channel on a magnetic tape and designated 1-0-1-1-0. The input signal A from the differential amplifier 22 in response to this data is illustrated. As shown, the recording technique used on the magnetic medium being read effects a flux change every time a binary 1 digit is recorded with alternate 1's being of opposite polarities. A 0 is indicated by no flux change. This recording technique is commonly termed NRZI. However, other techniques could be utilized. For example, a conventional RB ("return to bias") technique could be used wherein no flux change occurs for a 0 while all 1's are represented by saturation of the tape in one particular direction and a resumption of the original value.

Referring to FIGS. 2 and 3, in FIG. 3 at B, C, the output signals of differentiating circuits 32 and 36 are illustrated. The signals are obviously identical in that they are merely the differentiated result of the analog input signal A. As illustrated, the differentiated signal crosses zero at each peak (corresponding to each 1) in the input signal. For each peak in a positive pulse in signal A, the differentiated signal B, C, crosses zero from positive to negative. In response to sensing each of these occurrences, comparator 34 in peak-detector 28 provides a high to low transition within its output signal E. Each such high-low transition indicates the peak of a positive pulse in the input signal.

With respect to peak-detector 30, the differentiated signal from circuit 36 crosses zero from negative to positive at each negative to positive occurrences, comparator 38 provides a high to low transition in its output signal G.

As previously noted, analog comparator 24 whose output is indicated as D is concerned with positive pulses in the input signal. Analog comparator 26 is concerned with negative pulses in the input signal and its output is indicated as H in FIG. 3. Each of these comparators perform a threshold function and their threshold level is selectively set by the three-way switch 40 in FIG. 2. Examples of the various different threshold levels are shown in signal A of FIG. 3 and designated T1,T2 and T3 to correspond to the different voltages which may be selected, V1, V2 or V3, by switch 40. FIG. 3 illustrates the operation of the circuit for voltage V1 setting the comparators to respond to thresholds T1. As illustrated at D, analog comparator 24 provides a negative pulse corresponding to that portion of each positive pulse in the input signal A above threshold T1. Similarly, as indicated at H, comparator 26 provides a negative pulse corresponding to that portion of each negative pulse in signal A lower than threshold T1.

Signals D and E are gated through gate 42 which provides the signal F. A negative to positive transition is thus provided in signal F in response to each positive pulse at that pulse's peak. Similarly, signals G and H are fed to gate 44 which provides the signal I in response. A positive to negative transition occurs in signal I in response to each negative pulse in the input signal at that pulse's peak.

The signals F and I from gates 42 and 44 are fed to OR 46 which provides the signal J and thereby a positive to negative transition in response to each positive to negative transition in either signal.

The signal J from the output of OR 46 is fed through element 48 to the T input of flip-flop 50 which provides an output pulse in response to each positive to negative transition. The output of flip-flop 50 is indicated at L and comprises a series of positive pulses (the width of each determined by delay 52) which correspond to either positive or negative pulses in the analog signal A and occur at the peaks of these pulses.

As noted above, element 48 only delays negative to positive transitions in signal J. When a negative signal appears on lead 49 in the signal K from element 48, it is applied to the strobe inputs of comparators 34 and 38 to lock whichever of these elements is in the state providing a low peak-indicating output. This comparator is so locked for as long as the signal J is low and for a predetermined period of time (determined by the delay interval of 48) thereafter. Lead 48 thus serves to insulate the comparator (34 or 38) providing the low signal from noise but does not effect the other comparator.

As above noted, the circuit of the invention is capable of reading either seven or nine channel magnetic tape. Further, with switch 40, the accuracy of the circuit may be adjusted by changing the threshold level of elements 24 and 26. This may be particularly useful when initially tuning the circuit. Further the circuit of the invention is extremely simple and inexpensive.

It will be appreciated that various changes in the form and details of the above-described preferred embodiment may be effected by persons of ordinary skill without departing from the true spirit and scope of the invention.

I claim:

1. A circuit for reading information from a digital magnetic recording medium comprising:

transducer means for converting said information into an input signal comprising a train of positive and negative pulses corresponding to said information;

a first circuit comprising positive threshold means for receiving said input signal and providing a signal in response to each positive pulse in said input signal above a predetermined positive pulse in said input signal above a predetermined positive threshold level, positive peak-detecting means for receiving said input signal and providing a signal in response to the peak of each positive pulse in said input signal, positive gating means for receiving said signals from said positive threshold and positive peak-detecting means, said gating means providing a first signal in response to receiving both said signals;

a second circuit comprising negative threshold means for receiving said input signal and providing a signal in response to each negative pulse in said input signal below a predetermined negative threshold level, negative peak-detecting means for receiving said input signal and providing a signal in response to the peak of each negative pulse in said input signal, negative gating means for receiving said signals from said negative threshold and negative peak-detecting means, said negative gating means providing a second signal in response to receiving both said signals;

output circuit means for receiving said first and second signals from said first and second circuits, said output circuit means providing an output signal in response to either of said signals; and means, operating on said positive and negative threshold means, for selectively adjusting their threshold levels.

2. The circuit as recited in claim 1 and further including means, operating on said transducer means, for selectively adjusting the amplitude of the positive and negative pulses in said input signal.

3. The circuit as recited in claim 1 wherein said positive peak-detecting means comprises: a differentiating circuit for differentiating said input signal; and a circuit for receiving the output of said differentiating circuit and providing a signal in response to said output crossing zero from positive to negative.

4. The circuit as recited in claim 3 wherein said negative peak-detecting means comprises: a differentiating circuit for differentiating said input signal; and a circuit for receiving the output of said differentiating circuit and providing a signal in response to said output crossing zero from negative to positive.

5. The circuit as recited in claim 1 and further including means, responsive to each output signal from said output circuit, for maintaining one of said peak-detecting means in a state providing its output signal for a predetermined period of time, said peak detecting means being within the first or second circuit which provides the first or second signal to which said output circuit responds to provide said output signal.

6. In a circuit for detecting digital data recorded on a magnetic record medium, the combination comprising:

transducer means relatively movable with respect to said record medium for generating an input signal comprising a train of input pulses corresponding to said recorded data;

threshold means for receiving said input pulses and providing an output signal in response to each input pulse which is greater than an operating threshold level, said threshold means including adjustment means for temporarily setting said threshold level such that said output signals are generated only in response to input pulses which are greater than a reference level which is higher than and bears a predetermined relationship to said operating threshold level; and tuning means cooperating with said transducer means for selectively varying the amplitude of said input signal, said tuning means being operable in conjunction with said adjustment means for setting the maximum amplitude of said input pulses to a level substantially equal to said reference level whereby the relationship of said operating threshold level to the amplitude of said input pulses is precisely established.

7. The circuit set forth in claim 6 further comprising:

peak-detecting means for receiving said input pulses and providing a signal in response to the peak of each said pulse; and gating means for receiving said signals from said threshold means and said peak-detecting means and for providing a final output signal in response to receiving both said signals.

8. The circuit set forth in claim 6 wherein:

said threshold means includes means for shaping said output signals such that each has a width proportional to the length of time that its respective input pulse exceeds the threshold level; and said adjustment means includes means operable in response to actuation of said tuning means for indicating the setting of said tuning means which produces output signals of minimum width whereupon said condition of substantial equality between said input pulses and said reference level is established.

* * * * *